United States Patent [19]

Marriott et al.

[11] Patent Number: 5,268,049
[45] Date of Patent: Dec. 7, 1993

[54] METHOD OF LAMINATING GLASS SHEETS

[75] Inventors: Peter H. Marriott, Shongweni, South Africa; Stephen J. Tickle, Aintree, United Kingdom

[73] Assignee: Pilkington Glass Limited, United Kingdom

[21] Appl. No.: 804,700

[22] Filed: Dec. 11, 1991

[30] Foreign Application Priority Data

Dec. 11, 1990 [ZA] South Africa ............... 90/9945

[51] Int. Cl.⁵ .................................. B32B 17/00
[52] U.S. Cl. ......................... 156/99; 156/102; 156/103; 156/107; 156/145; 264/102; 264/261; 264/328.1; 264/46.5
[58] Field of Search ............ 428/34; 156/109, 107, 156/99, 102, 103, 145, 312; 52/171, 172, 788, 790, 789; 264/102, 261, 46.5, 328.1

[56] References Cited

FOREIGN PATENT DOCUMENTS

| | | |
|---|---|---|
| 0056719 | 7/1982 | European Pat. Off. |
| 0200394 | 11/1986 | European Pat. Off. |
| 2360527 | 3/1978 | France |
| 2576012 | 7/1986 | France |
| 2032844 | 5/1980 | United Kingdom |

Primary Examiner—Donald J. Loney
Attorney, Agent, or Firm—Burns, Doane, Swecker & Mathis

[57] ABSTRACT

A method of laminating glass sheets, the method comprising the steps of: (a) providing a glass sheet assembly comprising a pair of opposed glass sheets which are spaced from each other and spacer means located between the glass sheets, the spacer means being air permeable and liquid impermeable and extending along peripheral edges of the glass sheets, the glass sheet assembly being in a substantially horizontal orientation; (b) introducing a measured volume of a liquid laminating resin between the glass sheets so that the resin contacts the inner surfaces of both the top and bottom glass sheets as it is introduced into the space between the sheets, the introduction of resin being controlled so that a resin meniscus between the top and bottom sheets spreads outwardly in a controlled manner; (c) filling the space between the glass sheets with the measured volume of resin, air which is displaced by the resin being evacuated through the spacer means; and (d) permitting the resin to cure and solidify thereby to form an interlayer between the glass sheets. The invention also provides a laminated glass article comprising a pair of opposed glass sheets which are separated by an interlayer of a cast-in-place laminating material composed of a cured plastics resin, the resin having been introduced between the sheets as a liquid having a viscosity of from 200 to 4000 centipoise, and an air permeable and liquid impermeable spacer means extending around the periphery of the article between the glass sheets.

16 Claims, 4 Drawing Sheets

METHOD OF LAMINATING GLASS SHEETS

BACKGROUND TO THE INVENTION

The present invention relates to a method of laminating glass sheets and to a laminated glass article.

DESCRIPTION OF THE PRIOR ART

It is known in the art to manufacture laminated glass articles, for use, for example, as architectural windows, aircraft glazing and the like by providing a pair of glass sheets which are separated and adhered together by a plastics interlayer which has been cast-in-place between the glass sheets by the curing of a liquid resin. A number of methods for producing such laminates have been disclosed. However, the known methods suffer from a number of disadvantages, particularly when it is required to produce cast-in-place plastics interlayers from high viscosity liquid plastics resins.

GB-A-1483937 discloses the casting-in-place of a polyurethane interlayer between two glass sheets employing as an adhesive-spacer element between the glass sheets a polyurethane foam tape. The polyurethane foam tape is an open cell foam. When liquid resin is poured or pumped into the interlayer space between the two glass sheets, air is allowed to exit from the interlayer space at any point along the edge of the sheets while the space is being filled but the foam does not allow passage therethrough of any liquid resin. The casting is accomplished by merely pouring resin into the interlayer space between the glass sheets or by pumping a metered quantity of liquid resin into the interlayer space.

GB-A-1557086 discloses a laminated glass pane in which an air impermeable sealing member is disposed between two glass sheets at the peripheral edges thereof to define between the glass sheets an interlayer space which is filled with liquid resin. The liquid resin is pumped into the interlayer space through an inlet opening at one corner of the rectangular glass sheet assembly and air is evacuated at an opening in the seal remote from the inlet opening.

GB-B-2032844 discloses a method of producing a laminate in which a glass sheet assembly is held in a substantially vertical orientation and liquid resin is poured into the interlayer space between two glass sheets which are spaced by spacer of gas permeable tape.

EP-B-0200394 discloses a method of producing laminated sheet material in which a liquid resin is poured into a concavity in a central zone of a first glass sheet and then a second glass sheets is located over the first glass sheet. A liquid impermeable and air permeable sealant is applied between the sheets around the periphery thereof and the first and second sheets are caused to assume a planar position and then pressure is applied on the sheets for the liquid resin and the air to flow outwardly in the interspace between the sheets.

The present invention aims to overome or alleviate the problems inherent in the prior art described above.

SUMMARY OF THE INVENTION

Accordingly, the present invention provides a method of laminating glass sheets, the method comprising the steps of: (a) providing a glass sheet assembly comprising a pair of opposed glass sheets which are spaced from each other and spacer means located between the glass sheets, the spacer means being air permeable and liquid impermeable and extending along peripheral edges of the glass sheets, the glass sheet assembly being in a substantially horizontal orientation; (b) introducing a measured volume of a liquid laminating resin between the glass sheets so that the resin contacts the inner surfaces of both the top and bottom glass sheets as it is introduced into the space between the sheets, the introduction of resin being controlled so that a resin meniscus between the top and bottom sheets spreads outwardly in a controlled manner; (c) filling the space between the glass sheets with the measured volume of resin, air which is displaced by the resin being evacuated through the spacer means; and (d) permitting the resin to cure and solidify thereby to form an interlayer between the glass sheets.

Preferably, the resin is introduced into a substantially central region between the glass sheets.

The resin may be introduced into the space between the sheets through an injection nozzle extending between the glass sheets into the space therebetween.

More preferably, at a location of the peripheral edge of the glass sheet assembly at which the injection nozzle extends between the glass sheets, the glass sheets are separated by a separating device to form a gap, between the spacer means and one of the glass sheets, through which the injection nozzle is passed.

Optionally, a portion of the injection nozzle which extends between the glass sheets is at least partly covered by a protective member which substantially prevents the injection nozzle from contacting the surface of the glass sheets. The protective member may comprise a plastics sleeve which surrounds the injection nozzle.

Preferably, the spacer means comprises a foam tape having an open-cell structure which is self-adhesive on both sides thereof.

More preferably, during introducing step (b) the tape is adhered to both the top and bottom glass sheets thereby to adhere the glass sheets together around substantially their entire peripheral edges except at least at a region thereof where the resin is introduced between the glass sheets, at which region one side of the tape is adhered to one of the glass sheets and the other side of the tape is covered by a removable covering element. The region may extend along the whole of one side of the glass sheet assembly.

Still more preferably, after the introducing step (b) the covering element is removed from the tape and the glass sheets are additionally adhered together at the said region by the tape.

A method may further comprise pressing the two glass sheets together during step (c) so as to assist filling of the space between the glass sheets by the resin and evacuation of air through the spacer means. The pressing may be performed in a low pressure environment which enhances evacuation of air through the spacer means.

During the introducing step (b) the glass sheet assembly may be inclined at a small angle with respect to the horizontal. A typical angle is around 5° to the horizontal.

Preferably, the liquid laminating resin has a viscosity of from 50 to 4000 centipoise (at a temperature of 25° C.). This range is appropriate when the resin is introduced into the glass sheet assembly which is horizontal or inclined to the horizontal. More preferably, the viscosity is from 300 to 4000 centipoise (at a temperature of 25° C.) This range is appropriate when the glass sheet assembly is inclined to the horizontal during introduction of the resin. Especially preferred laminating resins have a viscosity (at a temperature of 25° C.) of around 300 centipoise or around 2000 centipoise. In this specification, all liquid viscosity values are specified at a temperature of 25° C.

The present invention also provides a laminated glass article comprising a pair of opposed glass sheets which are separated by an interlayer of a cast-in-place laminating material composed of a cured plastics resin, the resin having been introduced between the sheets as a liquid having a viscosity of from 200 to 4000 centipoise at a temperature of 25° C., and an air permeable and liquid impermeable spacer means extending around the periphery of the article between the glass sheets.

The liquid viscosity is preferably from 300 to 2000 centipoise (at a temperature of 25° C.).

Preferably, the interlayer is from 0.5 to 2 mm thick, more preferably from 0.8 to 1.8 mm thick, still more preferably from 1.3 to 1.6 mm thick.

Preferably, the spacer means comprises a foam tape having an open-cell structure which is adhered to the inner surfaces of the glass sheets.

The present invention further provides a method of laminating glass sheets, which includes the steps of: holding two glass sheets in an opposing parallel, substantially horizontal, spaced configuration with respect to one another, one sheet having elongate strips of an air permeable/liquid impermeable double sided adhesive tape adhered thereto along the peripheral edges thereof: charging a predetermined volume of a laminating resin into a central region between the two glass sheets, the space between the sheets and the viscosity of the resin being suitably predetermined so that the resin will adhere to both the top and bottom sheets upon being charged into the space between the sheets; pressing the sheets together until the sheets are adhered together via the adhesive tape, the resin is spread across the entire opposing surfaces of the glass sheets and substantially all air is displaced from the space between the glass sheets by being forced through the adhesive tape; and retaining the laminated sheets in a flat horizontal configuration until the resin has effectively set and cured.

The method of the invention may include, prior to charging of a laminating resin into a central region between the two glass sheets, effective washing or cleaning of at least the opposing surfaces of the glass sheets. Cleaning may take place by any conventional method utilising known cleaning liquids.

Still further, the method may include applying the air permeable/liquid impermeable double sided adhesive tape to one of the two glass sheets along the peripheral edges thereof, intially retaining a removable covering element on the exposed side of the adhesive tape.

As such, the method of the invention may include removing the said covering element from the adhesive tape prior to charging the laminating resin into the space between the two glass sheets. A portion of the said covering element may be retained in place during charging of the laminating resin, this region being the region across which a charging nozzle can pass into the central region between the glass sheets, thus ensuring that the resin will not come into contact with the exposed surface of the adhesive tape upon retraction of the charging nozzle and before pressing the two sheets together.

Handling of the glass sheets during the laminating operation may be conventional, glass sheets being held in a substantially vertical configuration on a suitable rack before and between the method steps, while a tilt table is used for holding either one or both glass sheets in a suitable horizontal configuration during method steps such as while applying the adhesive tape during charging of the laminating resin into a space between the glass sheets and during subsequent pressing and storage.

The method of the invention particularly may include holding the operative top glass sheet in its spaced configuration with respect to the bottom glass sheet, during charging of the laminating resin, by a lifting gantry engaged with the said glass sheet by means of a plurality of suction cups, or the like.

The laminating resin typically is a polyester resin, whereas the charging nozzle for charging the resin into the space between two sheets is a flat nozzle, the typical spacing between two glass sheets, during charging of the resin into the space between them, being in the region of 4 mm and the nozzle being suitably flat to fit between the said glass sheets.

The two sheets intially may be pressed together by merely lowering the operative top sheet on to the bottom sheet, which will permit the two sheets to adhere together, whereafter the gantry can pick up the two sheets and move the sheets to a suitable press during which the sheets can be forced together to provide for spreading of the laminating resin and forcing of air from the space between the sheets.

The said press may be a mechanical press and, additionally, may include vacuum means for creating a low pressure environment in the region surrounding the glass sheets during the pressing operation, to thereby enchance the extraction of air from the space between the glass sheets.

After the pressing operation, which typically can take in the region of six minutes (depending on the size of the laminate to be manufactured and the viscosity of the resin), laminated glass sheets can be stacked upon one another in a flat horizontal configuration to permit setting and curing of the resin, which typically can take in the region of twenty four hours.

The method of the invention also may be utilised for laminating three or more sheets on to one another.

BRIEF DESCRIPTION OF THE DRAWINGS

Embodiments of the present invention will now be described by way of example only, with reference to the accompanying drawings, in which.

DESCRIPTION OF THE PREFERRED EMBODIMENTS

Figure 1:
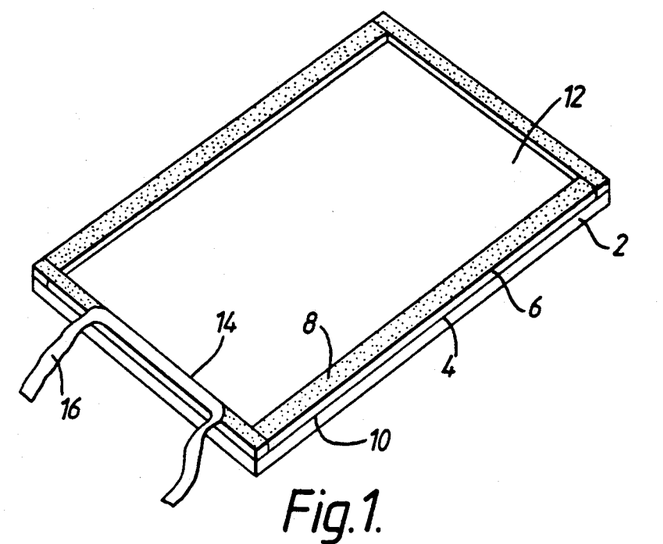
FIG. 1 is a perspective view of a glass sheet carrying a sealing means for forming a laminated glass article in accordance with a first embodiment of the present invention.

Referring to FIG. 1, a sheet 2 of glass, which may be toughened or annealed glass, and which in the preferred embodiment is shown as being rectangular, has adhered around the peripheral edge 4 thereof a self-adhesive foam tape 6 having an open-cell structure. The foam tape 6 may be a polyurethane foam tape such as that manufactured by Minnesota Mining and Manufacturing Company and sold under the trade mark "SCOTCH-MOUNT". The tape 6 is self-adhesive on two opposed surfaces 8,10 thereof. The bottom adhesive surface 10 is adhered to the upper surface 12 of the glass sheet 2 and the other adhesive surface 8 of the tape is exposed except at one region 14 thereof where the adhesive surface 8 remains covered by a removable covering element 16 comprising a length of release paper, the removable covering element 16 having originally covered all of the self-adhesive surface 8 of the tape 6. The region 14 may extend along the whole length of one side of the glass sheet assembly 20. In the illustrated embodiment the tape 6 extends all around the entire peripheral edge of the assembly. However, if desired the tape can extend around only part of the peripheral edge. For example, that edge of the assembly through which resin is injected does not initially need to have a tape portion adhered thereto and the tape portion can be inserted between the sheets after introduction of the liquid resin therebetween.

Figure 2:
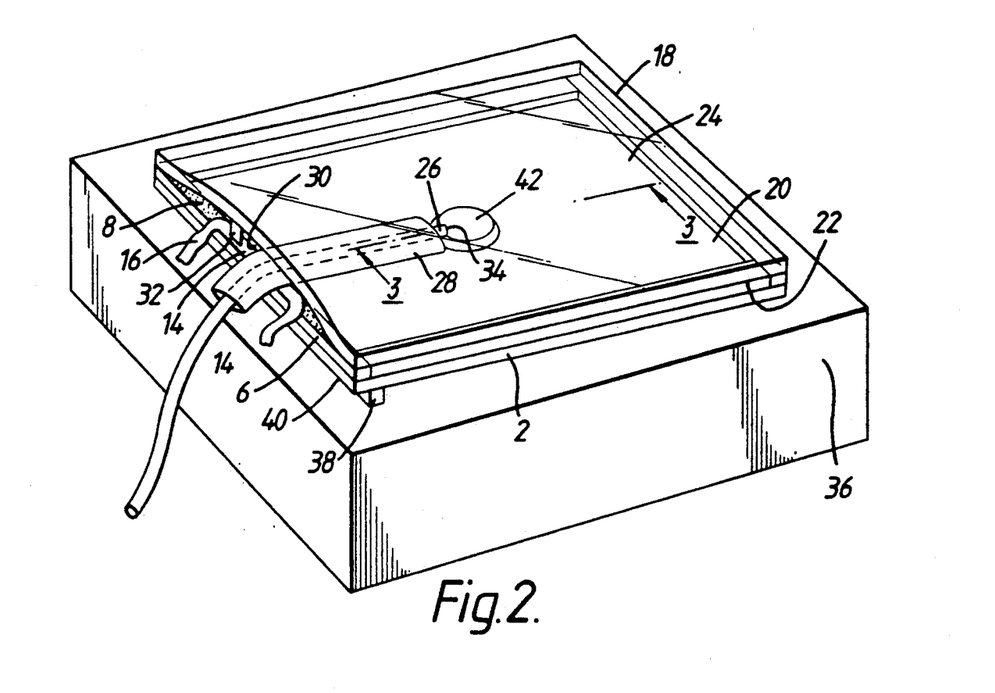
FIG. 2 is a perspective view of a glass sheet assembly incorporating the glass sheet and sealing means of FIG. 1 for manufacture of a laminated glass article in accordance with a first embodiment of the present invention during introduction of a liquid laminating resin between the glass sheets.

Referring to FIG. 2, a second glass sheet 18 having the same dimensions as that of the first glass sheet 2 is located over the first glass sheet 2 having the tape 6 thereon and the bottom surface of glass sheet 18 is adhered to the first glass sheet 2 by the exposed adhesive surface 8 of the tape 6. This forms a glass sheet assembly 20 which is adhered around its peripheral edge 22 except at the region 14 where the removable covering element 16 covers the adhesive surface 8 thereby to prevent at that region 14 the second glass sheet 18 being adhered to the first glass sheet 2 via the adhesive tape 6. In the glass sheet assembly 20, an interlayer space 24 is defined between the two glass sheets 2,18 and by the tape 6. The tape 6 is formed of a foam material which is air permeable but liquid impermeable thereby to define a sealing means around the peripheral edge 22 of the glass sheet assembly 20 and thus around the interlayer space 24. The thickness of the foam tape 6 defines the edge thickness of the interlayer space 24 and thus the thickness of the edge of the interlayer in the resultant laminated article. The thickness of the body of the interlayer in the resultant laminated article can, particularly for large area laminates, vary slightly from that of the foam tape depending upon the volume of resin introduced into the interlayer space 24. Typically, for a large area (e.g. 3.6 sq. meters) laminate the foam tape may be 1.6 mm thick and the interlayer may be 1.8 mm thick, i.e. the interlayer may be slightly thicker than the laminate. Typically, the interlayer space 24 is from 0.5 to 2 mm thick. Particularly preferred thicknesses of the interlayer space are 0.8 mm, 1.0 mm, 1.3 mm, 1.5 mm, 1.6 mm and 1.8 mm. As is shown in FIG. 2, an injection nozzle 26, typically of flexible plastics material, and being surrounded by a protective sleeve 28 of plastics material, which latter prevents liquid resin which is injected from the injection nozzle as described hereinafter inadvertently being deposited on the glass sheets by the injection nozzle 26 when the nozzle is introduced into or removed from the glass sheet assembly, is slid into a gap 30 formed between the tape 6 and the second glass sheet 18 by a separating device 32 which is disposed between the two glass sheets 2,18. The separating device 32 bends slightly upwardly the top glass sheet 18 thereby to form the gap 30 which is located above the region 14 of the tape 6 which is covered by the removable covering element 16. The end 34 of the nozzle 26 is disposed at a substantially central region of the interlayer space 24 between the two glass sheets 2,18. The protective sleeve 28 is prevented from inadvertently adhering to the adhesive surface 8 of the tape 6 by the removable covering element 16. The entire assembly is disposed on a horizontal support surface 36 and, by means of a raising device 38, the glass sheet assembly 20 is inclined at a small angle to the horizontal, typically 5°, in a downwardly direction with respect to flow of liquid resin from the end 34 of the nozzle 26. Thus, the raising device 38 is preferably located beneath the glass sheet assembly 20 at a position substantially underneath that edge 40 of the glass sheet assembly 20 through which the injection nozzle 26 is inserted.

Figure 3:
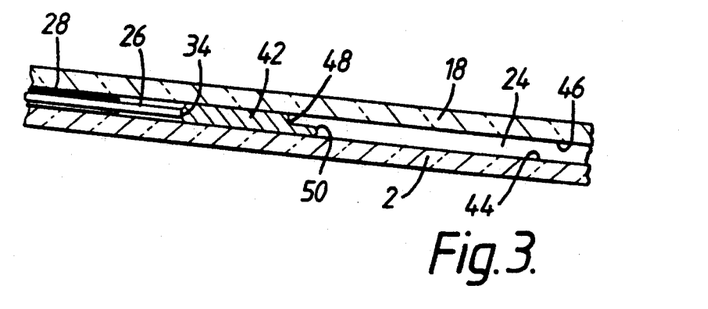
FIG. 3 is an enlarged part-sectional side view of a central part of the assembly of FIG. 2 and shows in greater detail the glass sheet assembly of FIG. 2 during introduction of the liquid laminating resin between the glass sheets.

A measured amount of curable liquid plastics resin is then injected out through the end 34 of the injection nozzle 26 into the interlayer space 26 from a reservoir (not shown) thereof by a pumping device (not shown). The initial stage of injection is shown in FIG. 2 wherein a body 42 of liquid resin is shown flowing outwardly from the end 34 of the nozzle 26. As is shown more clearly with reference to FIG. 3, the liquid laminating resin 42 is introduced between the glass sheets 2,18 so that the resin 42 contacts the inner surfaces 44,46 of the top and bottom glass sheets 18,2 respectively, as the resin 42 is being introduced into the space 24 between the sheets 2,18. The introduction of the resin 42 is controlled so that a resin meniscus 48 is formed between the glass sheet inner surfaces 44,46 which spreads outwardly from the end 34 of the nozzle 26 in a controlled manner. We have found that the meniscus 48 is, with some viscosities of liquid resin, proceeded by a leading edge 50 thereof which is located slightly ahead of the main body 42 of the resin on the inner surface 44 of the bottom glass sheet 2.

Figure 4:
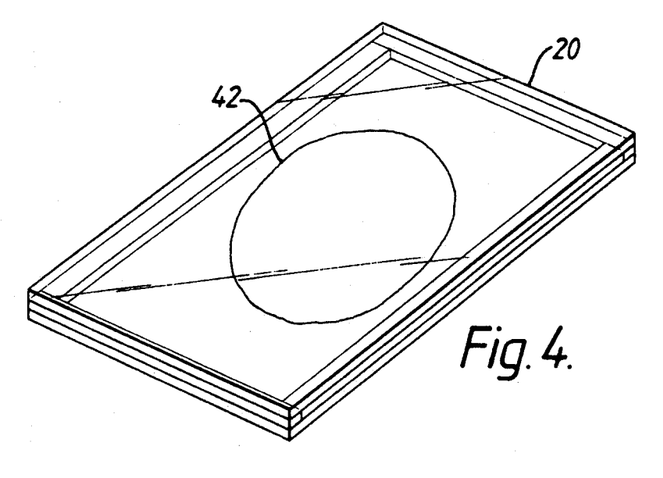
FIG. 4 is a perspective view of the glass assembly of FIG. 2 after a measured volume of the liquid laminating resin has been introduced between the glass sheets and after sealing of the entire peripheral edge of the glass sheet assembly.

After the measured volume of the liquid resin has been introduced into the interlayer space 24, the measured volume corresponding to the volume of the interlayer space 24 itself, the nozzle 26 and sleeve 28 are withdrawn from between the two glass sheets 2,18 and the separating device 32 is removed. The removable covering element 16 is then pulled off from the adhesive surface 8 and the upper glass sheet 18 is adhered in the vicinity of region 14 to the bottom glass sheet 2 by the tape 6 so that the top and bottom glass sheets 18,2 are adhered together by the tape 6 around their entire peripheral edge 22. The resultant glass sheet assembly is shown in FIG. 4.

The interlayer space 24 between the glass sheets 2,18 is then filled completely with the measured volume of resin 42 by distributing the resin 42 evenly throughout the space 24 and air which is present in the interlayer space 24 is displaced by the resin 42 during this filling process and is evacuated from the interlayer space 24 through the air permeable tape 6. The filling process can be carried out by simply permitting the gravitational weight of the upper sheet 18 acting on the body of liquid resin 42 to spread the liquid resin 42 uniformly throughout the interlayer space 24 so as completely to fill the interlayer space 24. This is generally applicable if the laminate has a relatively small surface area and if the viscosity of the resin is not particularly high. Alternatively, the glass sheet assembly can be disposed in a reduced pressure environment, such as in a vacuum box, thereby to press the two sheets 18,2 together and assist evacuation of air from the interlayer space through the air permeable tape 6. This is generally applicable for higher viscosity resins. If desired, pressure may additionally be applied directly to the upper glass sheet 18 to enhance the pressing of the two glass sheets 2,18 together.

Figure 5:
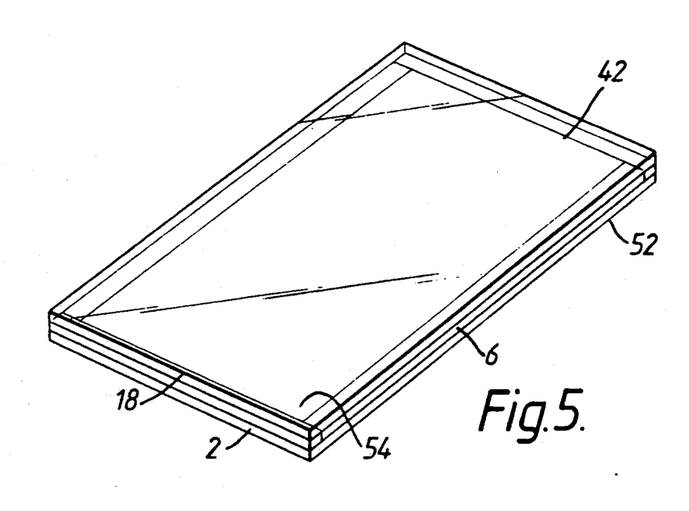
FIG. 5 is a perspective view of a laminated glass article in accordance with the invention having been formed from the glass assembly of FIG. 4 by filling of the interlayer space between the glass sheets by the resin.

After the interlayer space 24 has been completely filled with liquid resin 42, the resin 42 is permitted to cure and solidify thereby to form the resultant glass laminate 52 which is shown in FIG. 5, the laminate 52 having an interlayer 54 formed from the resin 42 which adheres the two glass sheets 2,18 together and also having the tape 6 around the periphery thereof.

Typically, the laminating process is carried out at a temperature of around 15° to 25° C.

In the illustrated embodiment, the filling of the interlayer space 24 by the resin 42 is carried out with the glass assembly 20 inclined at a small angle to the horizontal. Depending on the viscosity of the resin, and on the dimensions of the interlayer space, the angle can be varied as required. It has been found that the angle can vary up to 20° but typically is around 5°. It has been found that this assists the filling of the interlayer space 24 by the liquid resin 42 since the resin tends to flow down the inclined glass surface controllably. However, the liquid resin may be introduced between the glass sheets with the glass sheet being in a horizontal orientation. Thus in accordance with the invention, the liquid resin is introduced between the glass sheet with the glass sheet assembly being in a substantially horizontal orientation, which encompasses the glass sheet assembly being horizontal or inclined at a small angle (e.g. up to 20°) to the horizontal.

The liquid resin which is employed to form the laminating interlayer 54 may be composed of any known casting liquid plastics resin which is known for use in forming cast-in-place interlayers in laminates. The present invention has particular application when it is desired to employ relatively high viscosity resins, typically having a viscosity of from 50 to 4000 centipoise at a temperature of 25° C. when the glass sheet assembly is horizontal or inclined during resin introduction, and typically a viscosity of from 300 to 4000 centipoise at a temperature of 25° C. when the glass sheet assembly is inclined during resin introduction. Preferred viscosity values for suitable resins are around 55, 110, 300, 1000 and 2000 centipoise. A suitable resin is sold by Freeman Chemicals Limited, U.K. under the name STYPOL 40-6519 which is an unsaturated polyester resin in styrene monomer and has a viscosity of 100 to 125 centipoise at 25° C. Other suitable resins are made by UCB (Chem) Limited, U.K. under the names UVEKOL S15 and S20 which have viscosities at 25° C. of 77 and 200 centipoise respectively. It has been found in accordance with the present invention that by forming a resin meniscus between the top and bottom sheets as the resin is introduced into the space between the sheets, this enables the meniscus to be formed, between the two glass sheets and to move outwardly away from the nozzle end, in a controlled manner which leads to a controllable distribution of resin liquid in the interlayer space so that on filling of the interlayer space by migration of the liquid resin the liquid resin does not flow back on itself so as to form air bubbles in the interlayer space which are present in the resultant glass laminate.

It has been found in practice that a number of parameters affect the formation of the resin meniscus in accordance with the method of the invention for any particular application of the invention. Thus, the liquid resin viscosity, thickness of the interlayer space, inclination of the glass sheet assembly, size of laminate to be produced, temperatures of fabrication, location of the introduction of the liquid resin into the interlayer space, surface tension between the liquid resin and the glass surfaces and the use of a vacuum or additional pressure to assist even distribution of the resin in the interlayer space are all interrelating parameters which can affect the formation of the meniscus and controlled introduction of the liquid resin into the interlayer space. The man skilled in the art can readily select the appropriate parameters for any given laminate to be produced in accordance with the invention by routine testing. As a general rule, the higher the resin viscosity the greater the use of an inclined glass sheet assembly during resin introduction and the greater the use of a vacuum source to evacuate air from the interlayer space. Also, larger glass sheet areas and/or thinner interlayer spaces are generally easier to fill with lower viscosity liquid resins.

The prior art relating to cast-in-place laminated layers has generally attempted to address the problem of avoiding the formation of such bubbles. The present invention, by controlled formation of a meniscus extending between the two glass sheets, thereby controls the initial disposition of the resin liquid between the glass sheets which subsequently prevents such bubble formation. This a real technical advance in the art, particularly when high viscosity resins are employed.

The present invention has, especially when employing the preferred high viscosity resin materials for the interlayer, particular application in the manufacture of safety laminates, security and bullet resistant laminates, acoustic laminates, anti-vandal laminates and fire retardant laminates.

Figure 6A:
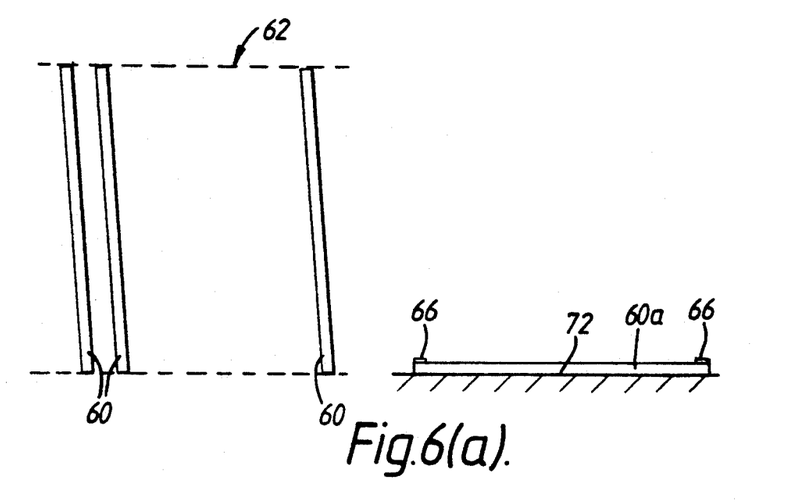
FIGS. 6(a) to (h) show schematically a series of sequential step in a method of laminating glass sheets in accordance with the second embodiment of the present invention.

Referring generally to FIG. 6, which shows the second embodiment of the present invention, and in particular FIG. 6(a), the first step in the method of laminating glass sheets includes the cleaning of at least the surfaces of two glass sheets 60 that are to be laminated to one another. Glass sheets 60 are initially provided in a substantially upright configuration on a storage rack 62, permitting the operative leading glass sheet 60(a) to be tilted by means of a conventional tilt table 64 from its upright configuration into a horizontal configuration as shown. This will permit the effective cleaning of the two surfaces to be adhered to one another by the laminating of the sheets, cleaning being carried out in a conventional manner using known cleaning liquids and techniques.

Figure 6B:
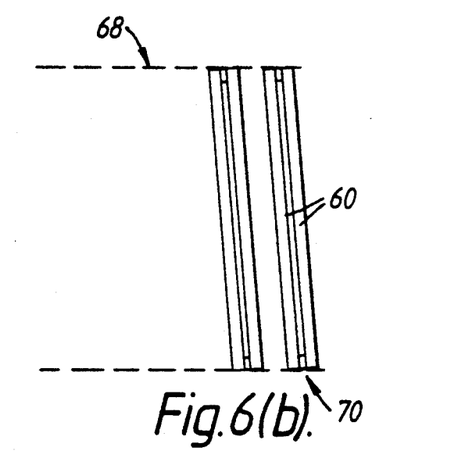

After cleaning, strips 66 of an air permeable/liquid impermeable double sided adhesive tape are applied along the peripheral edges of the sheet 60a, glass sheets to be laminated together usually being square or rectangular and this requiring four strips 66 to be applied along the four edges thereof. The exposed faces of the strips 66 remain covered by a removable covering element, the next step after cleaning and the application of the strips being, as shown in FIG. 6(b). to tilt the sheet 60a back into its substantially upright position opposing the sheet 60 immediately behind it and permitting the pair of sheets 70 to be supported on a further storage rack 68.

Figure 6C:
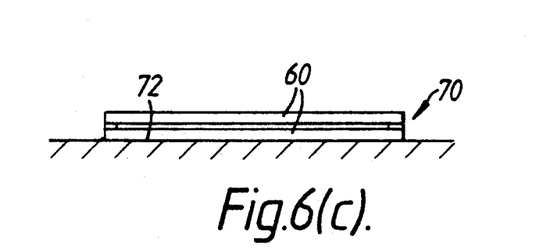

From the storage rack 68 the leading pair of sheets 70 is tilted into a horizontal position, as shown in FIG. 6(c), by means of a further tilt table 72, tilt tables utilised in carrying out the method of the invention being of a conventional type and being well known. Therefore, the features of these tilt tables are not described in any further detail herein.

Figure 6D:
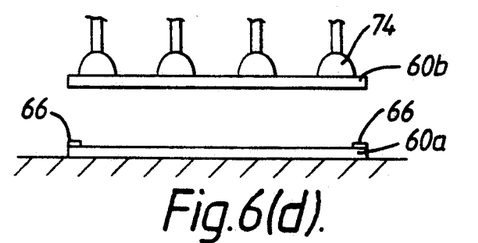

When in this configuration, as shown in FIG. 6(d), the top glass sheet 60b is engaged by a plurality of suction cups 74 of a lifting gantry, the suction cups 74 typically being disposed at approximately 300 mm centres permitting the sheet 60b to be picked up from the bottom sheet 60a and be held in a horizontal configuration as shown. When so picked up the covering elements of the strips 66 along three sides of the sheet 60a can be removed while the covering element of the strip 66a is maintainted on the said strip.

Figure 6E:
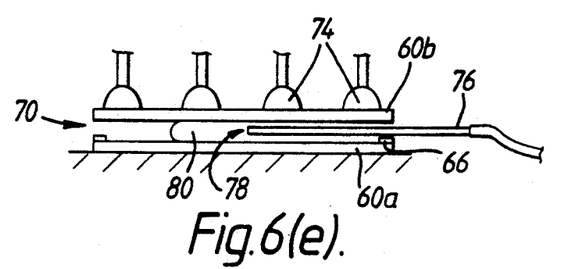

Thereafter, as shown in FIG. 6(e), the lifting gantry can lower the top glass sheet 60b to a position in which it is spaced from the sheet 60a by approximately 4 mm, whereafter a charging nozzle 76 is inserted into the space between the sheets 60, to a location where the nozzle end 78 is approximatley centrally located with respect to the sheets 60. The cross sectional profile and size of the nozzle 76 is such that it can fit between the sheets.

When properly located, a laminating resin, in the form of a polysester resin of suitable viscosity, can be charged into the space between the sheets 60, the spacing between the sheets 60 and the viscosity of the resin being such that the resin comes into contact with both the opposing surfaces of the sheets 60, thus forming a continuous resin body 80 between the sheets 60, this body 80 spreading in a controlled manner until a predetermined required volume of resin has been charged into the said space.

Thereafter, the nozzle 76 can be retracted from between the sheets 60, whereafter the covering element of the adhesive strip 66a can be removed. This covering element is initially kept in position to ensure that resin attaching to the nozzle 76 will not come into contact with the adhesive surface of the strip 66a, which can affect sealing between the sheets 10 when adhered together.

Figure 6F:
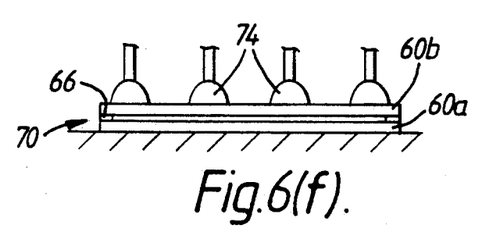

Once the said covering strip has been removed, as shown in FIG. 6(f) the lifting gantry can lower the sheet 60 onto the sheet 60a permitting the two sheets to be adhered together by means of the double sided adhesive tape strips 66.

Figure 6G:
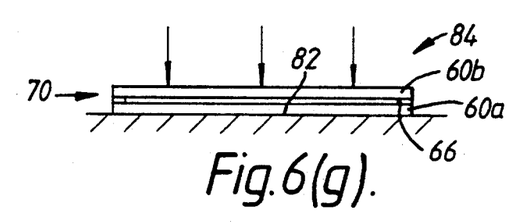

When so adhered together, as shown in FIG. 6(g), the pair of sheets 70 can be lifted on to the base 82 of a press 84 by means of the lifting gantry, whereafter the gantry can be released from the sheet 60b and the press 84 can be rendered operative for applying a pressure on the sheet 60b.

This pressure acting on the sheet 60b will cause effective spreading of the resin between the sheets 60 and will also force substantially all air disposed between the sheets 60 from the space between them, via the strips 66 of double sided adhesive tape. This pressing process continues until the entire opposing surfaces of the sheets 60 are covered by the resin and all air is removed from between the sheets 60. In order to enhance this process the press 84 may provide for a low pressure environment surrounding the sheets 60 which further enchances the removal of air from between the sheets 60.

Figure 6H:
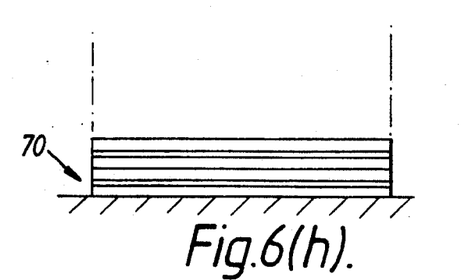

After this process has been completed, as shown in FIG. 6(h), the laminated pair of sheets 70 is placed on to a horizontal support, with further pairs of laminated sheets stacked upon it, thus allowing the resin to finally set and cure. Lifting of the sheets can again be carried out by a suitable lifting gantry.

The total cycle time for laminating a pair of glass sheets is typically approximately six minutes, whereafter the laminated sheets are typically maintained in their horizontal configuration for approximately twenty four hours, before the sheets can be finally removed and when the laminated sheets are then ready for use.

It must be understood that the exact steps of the method as described above can be varied in various different respects, while still including the main principle of the invention, which relates to the charging of a laminating resin between two sheets in the manner described above. Insofar as this particular step is concerned, the spacing between the sheets and the viscosity of the resin is variable, the main requirement being that the resin will immediately make contact with and attach itself to both sheets when charged into the space between the sheets.

It is believed that the complete method as described can become fully mechanised. Another benefit of the method being that possible ingress of dirt particles between sheets is greatly eliminated because sheets remain in a relatively closely spaced configuration above one another, particularly when the resin is introduced. Also by utilising the method as proposed, the possible formation of air bubbles between sheets also is greatly eliminated, but ensuring an efficient process with a very low reject rate.

Clearly the method of the invention also can be used for laminating various other materials having similar properties to that of glass and, therefore, requiring a similar type laminating process. Also, the method the invention can be utilised for laminating three or more sheets of material.

The present invention relates particularly to the laminating of sheets of glass, although the invention can also be employed for laminating sheets of any other materials, such as perspex, polyester, polycarbonate, polyacrylate, or other synthetic plastics, which are conventionally laminated in a similar manner to glass. For example, the present invention may be employed to manufacture bullet resistant glazing comprising a laminate of glass/interlayer (formed from cast-in-place resin)/polycarbonate. In this specification, any reference to laminating of glass sheets should be interpreted as a reference to laminating sheets of other materials as identified hereinabove.

What is claimed is:

1. A method of laminating glass sheets, the method comprising the steps of:
   (a) providing a glass sheet assembly comprising a pair of opposed glass sheets which are spaced from each other and spacer means located between the glass sheets, the spacer means being air permeable and liquid impermeable and extending along peripheral edges of the glass sheets, the glass sheet assembly being in a substantially horizontal orientation;

(b) introducing a measured volume of a liquid laminating resin between the glass sheets so that the resin contacts the inner surfaces of both the top and bottom glass sheets as it is introduced into the space between the sheets, the introduction of resin being controlled so that a resin meniscus between the top and bottom sheets spreads outwardly in a controlled manner;

(c) filling the space between the glass sheets with the measured volume of resin, air which is displaced by the resin being evacuated through the spacer means; and (d) permitting the resin to cure and solidify thereby to form an interlayer between the glass sheets.

2. A method according to claim 1 wherein the resin is introduced into a substantially central region between the glass sheets.

3. A method according to claim 1 wherein the resin is introduced into the space between the sheets through an injection nozzle extending between the glass sheets into the space therebetween.

4. A method according to claim 3 wherein at a location of the peripheral edge of the glass sheet assembly at which the injection nozzle extends between the glass sheets, the glass sheets are separated by a separating device to form a gap, between the spacer means and one of the glass sheets, through which the injection nozzle is passed.

5. A method according to claim 3 wherein a portion of the injection nozzle which extends between the glass sheets is at least partly covered by a protective member which substantially presents the injection nozzle from contacting the surface of the glass sheets.

6. A method according to claim 5 wherein the protective member comprises a plastics sleeve which surrounds the injection nozzle.

7. A method according to claim 1 wherein the spacer means comprises a foam tape having an open-cell structure which is self-adhesive on both sides thereof.

8. A method according to claim 7 wherein during introducing step (b) the tape is adhered to both the top and bottom glass sheets thereby to adhere the glass sheets together around substantially their entire peripheral edges except at least at a region thereof where the resin is introduced between the glass sheets, at which region one side of the tape is adhered to the glass sheets and the other side of the tape is covered by a removable covering element.

9. A method according to claim 8, wherein after introducing step (b), the covering element is removed from the tape and the glass sheets are additionally adhered together at the said region by the tape.

10. A method according to claim 1 further comprising pressing the two glass sheets together during step (c) so as to assist filling of the space between the glass sheets by the resin and evacuation of air through the spacer means.

11. A method according to claim 10 wherein the pressing is performed in a low pressure environment which enhances evacuation of air through the spacer means.

12. A method according to claim 1 wherein during the introducing step (b) the glass sheet is inclined at a small angle with respect to the horizontal.

13. A method according to claim 12 wherein during the introducing step (b) the sheet assembly is inclined at an angle of around 5° to the horizontal.

14. A method according to claim 1 wherein the liquid laminating resin has a viscosity of from 50 to 4000 centipoise.

15. A method according to claim 14 wherein the liquid laminating resin has a viscosity of from 300 to 4000 centipoise.

16. A method of laminating glass sheets, which includes the steps of:

holding two glass sheets in an opposing parallel, substantially horizontal, spaced configuration with respect to one another, one sheet having elongate strips of an air permeable/liquid impermeable double sided adhesive tape adhered thereto along the peripheral edges thereof:

charging a predetermined volume of a laminating resin into a central region between the two glass sheets, the space between the sheets and the viscosity of the resin being suitably predetermined so that the resin will adhere to both the top and bottom sheets upon being charged into the space between the sheets;

pressing the sheets together until the sheets are adhered together via the adhesive tape, the resin is spread across the entire opposing surfaces of the glass sheets and substantially all air is displaced from the space between the glass sheets by being forced through the adhesive tape; and retaining the laminated sheets in a flat horizontal configuration until the resin has effectively set and cured.

* * * * *